United States Patent [19]

Johnson, Jr.

[11] Patent Number: 5,120,781

[45] Date of Patent: Jun. 9, 1992

[54] ACID-MODIFIED POLYHYDRIC ALCOHOL ROSIN ESTER TACKIFIERS AND HOT MELT ADHESIVE COMPOSITIONS CONTAINING THOSE TACKIFIERS

[75] Inventor: Robert W. Johnson, Jr., Savannah, Ga.

[73] Assignee: Union Camp Corporation, Wayne, N.J.

[21] Appl. No.: 696,657

[22] Filed: May 7, 1991

[51] Int. Cl.$^5$ .................. C08L 93/04; C08L 47/00
[52] U.S. Cl. .................. 524/274; 524/272; 524/511
[58] Field of Search ........... 524/272, 244, 487, 488, 524/489, 511

[56] References Cited

U.S. PATENT DOCUMENTS 3,652,474 3/1972 Berry et al. .................. 524/272

Primary Examiner—Paul R. Michl
Assistant Examiner—Peter Szekely
Attorney, Agent, or Firm—William K. Wissing

[57] ABSTRACT

Polyhydric alcohol rosin esters which had been modified with an aromatic dibasic acid such that the softening point of the acid-modified polyhydric alcohol rosin ester is higher than that of a comparable unmodified polyhydric alcohol rosin ester are used as tackifiers in hot melt adhesive compositions. The hot melt adhesives compositions which utilize the acid-modified rosin ester tackifiers contain at least one of an ethylenic copolymer and a styrenic block copolymer, at least one of a wax and an oil, and the acid-modified polyhydric alcohol rosin ester tackifier. The hot melt adhesive compositions may be used as, for example, hot melt carton and package sealing adhesives, sealants, bookbinding adhesives, assembly adhesives, and are useful for the assembly of disposable articles using multiline construction techniques wherein at least one polyethylene or polypropylene substrate is bonded to at least one tissue, non-woven, polyethylene or polypropylene substrate.

28 Claims, No Drawings

ACID-MODIFIED POLYHYDRIC ALCOHOL ROSIN ESTER TACKIFIERS AND HOT MELT ADHESIVE COMPOSITIONS CONTAINING THOSE TACKIFIERS The invention relates to polyhydric alcohol rosin ester tackifiers which has been modified with an aromatic dibasic acid such that the softening point of the modified tackifier is higher then that of a comparable unmodified rosin ester, and hot melt adhesive compositions which utilize those acid-modified rosin ester tackifiers.

BACKGROUND OF THE INVENTION

Rosin esters comprising polyhydric alcohols are well known in the prior art. Woodruff, U.S. Pat. No. 2,424,424, discloses high molecular weight esters comprising rosin and pentaerythritol. Johnson, U.S. Pat. No. 4,758,379, discloses a method of preparing polyol esters of rosin comprising carrying out the esterification in an equivalent excess proportion of the rosin. Further, Maeda et al., U.S. Pat. No. 4,847,010, disclose a process for preparing a rosin ester which comprises purifying a rosin and/or a disproportionated rosin, esterifying the purified rosin and/or purified disproportionated rosin with an alcohol and subjecting the esterified rosin and/or esterified disproportionated rosin to hydrogenating.

Catalysts are often used to accelerate the reaction rate of the esterification of rosin with a polyhydric alcohol, as well as to provide color improvements. In Duncan, et al., U.S. Pat. No. 4,548,746, phosphinic acid is used in very small quantities to act as a catalyst for esterification of rosin with pentaerythritol. In U.S. Pat. No. 4,650,607, Lampo et al., the catalytic combination of phosphinic acid and a phenol sulfide compound is disclosed.

Acid-modified polyhydric alcohol rosin esters are also known in the prior art. Savageau et al., U.S. Pat. No. 3,772,171, disclose a maleic acid-modified pentaerythritol rosin ester for use in quick-setting ink formulations. McInnes et al., U.S. Pat. No. 3,874,898, disclose isophthalic-modified pentaerythritol rosin esters which are used in the formulation of paste printing ink vehicles. A binder for toner preparation comprising as the main constituent thereof a polyester composed of a polybasic acid component and a polyhydric alcohol component with a rosin-modified polyhydric alcohol introduced as part of the polyhydric alcohol component is disclosed in Matsumura et al., U.S. Pat. No. 4,981,939. Polybasic acids disclosed therein for use in those binders include terephthalic acid and isophthalic acid.

There is a long felt need to develop tackifiers for use in hot melt adhesive compositions. While the existence of polyhydric alcohol rosin esters, including acid-modified pentaerythritol rosin esters, is well documented in the prior art, none of the rosin esters discussed heretofore have been employed as tackifiers in hot melt adhesive compositions. This is due in part to compatibility problems between the rosin esters described heretofore and polymers or copolymers used in hot melt adhesive formulations.

In order for the rosin ester tackifiers to be used in hot melt adhesive compositions, it is necessary that the softening point of the rosin ester tackifier be sufficiently high for use in the hot melt compositions. Additionally, the rosin ester tackifier must be relatively compatible with the polymers or copolymers used in the hot melt adhesives. That is, the hot melt adhesive compositions containing the rosin ester tackifier should be relatively clear, i.e. not too hazy or opaque, and viscosity stable, i.e. not susceptible to excessive viscosity increase over time.

In U.S. Pat. No. 4,725,384, Du Vernet, rosin esters prepared by reacting a rosin and a polyhydric alcohol in the presence of a catalytic combination of phosphinic acid and a phenol sulfide compound are further treated with a magnesium salt of an organic acid to improve the clarity and viscosity stability of hot melt adhesives using those rosin esters as tackifiers.

One approach to increasing the softening point of the rosin ester tackifier is described in Matsuo, et al., U.S. Pat. No. 4,302,371. In Matsuo, a process for preparing a stabilized rosin ester having a higher softening point is disclosed which comprises subjecting a rosin to disproportionation and purification, and esterifying the resulting purified, disproportionated rosin with a tri- or more valent polyhydric alcohol, to give a rosin having a ring and ball softening point of 65° C. to 140° C. Matsuo, et al. found that, even by preparing a rosin ester by first purifying a rosin as a starting material to remove the higher molecular materials and unsaponifiable materials and then esterifying the purified rosin with the polyhydric alcohol, the properties of the rosin ester thus obtained were not sufficiently improved to be used as hot melt adhesives.

In order to prepare rosin esters having sufficient properties for use in hot melt adhesives, Matsuo et al. found that it was necessary to first disproportionate the rosin as a starting material, then purify the disproportionated rosin to remove high molecular materials and unsaponifiable materials, and finally esterify the purified, disproportionated rosin with a polyhydric alcohol. The methods of Matsuo are uneconomical and undesirable in that the disproportionation and purification methods, such as distillation under reduced pressure, crystallization and extraction, are time consuming, require additional expensive apparatus and restrict the supply of rosin used in the esterification process for preparation of the rosin esters. Therefore, the hot melt adhesives formulated with the rosin ester tackifier will likewise be economically undesirable.

There is a need then for hot melt adhesive compositions which may be used at elevated temperatures. There is further a need for hot melt adhesive compositions which contain rosin ester tackifiers having elevated softening points. The tackifiers must be stable and compatible with polymers or copolymers used in the preparation of the hot melt adhesive compositions, and must be prepared by economically desirable methods.

The Applicants of the present invention have surprisingly discovered that hot melt adhesive compositions can be prepared using acid-modified polyhydric alcohol rosin ester tackifiers having elevated softening points over comparable unmodified polyhydric alcohol rosin esters. The acid-modified tackifiers are prepared by methods which eliminate the need for the complicated and economically undesirable disproportionation/purification methods.

SUMMARY OF THE INVENTION

The acid-modified rosin ester tackifiers of the present invention comprise a rosin, a polyhydric alcohol and an aromatic dibasic acid in amounts which result in a tackifier having a higher softening point than a comparable unmodified polyhydric alcohol rosin ester. The tackifiers may further comprise catalytic amounts of esterification and/or disproportionation catalysts. The tackifiers of the present invention are used in the formulation of novel hot melt adhesive compositions.

The hot melt adhesive compositions of the present invention comprise a polymer or copolymer, optionally at least one of a wax or oil, and an acid-modified rosin ester, wherein the acid-modified rosin ester is prepared by esterifying a rosin with a polyhydric alcohol under conditions effective to substantially complete the esterification reaction, and adding thereto an aromatic dibasic acid in an amount effective to increase the softening point of the acid-modified rosin ester tackifier when compared to a comparable unmodified polyhydric alcohol rosin ester.

DETAILED DESCRIPTION OF THE INVENTION

The rosins which may be used in preparation of the acid-modified rosin ester tackifiers of the present invention are well known compounds, as are methods of their preparation. Rosin is mainly a mixture of $C_{20}$, fused-ring, monocarboxylic acids, typified by levopimeric and abietic acids. The rosins include gum rosin, wood rosin and tall oil rosin. The tall oil rosins are particularly preferred in the preparation of the tackifiers used in the present invention. The rosin may be crude, untreated rosin, or may be hydrogenated, disproportionated or polymerized prior to the esterification reaction.

The polyhydric alcohols employed in the preparation of the tackifiers of the present invention are also well known and are represented by diols such as ethylene glycol, propylene glycol, diethylene glycol, triethylene glycol, tetraethylene glycol, trimethylene glycol; triols such as glycerol; tetrols such as pentaerythritol; hexols such as mannitol and sorbitol and like polyols. Pentaerythritol is most preferred in the preparation of the tackifiers used in the present invention.

The esterification reaction used in preparing the acid-modified rosin ester tackifiers of the present invention may be conducted in the presence of catalytic amounts of at least one esterification catalyst. Such catalysts include, for example, phosphoric acid, phosphorous acid, hypophosphorous acid, calcium hydroxide, zinc oxide, para-toluene sulfonic acid, lithium carbonate, or mixtures thereof. A catalytic amount as used herein is within the range of from about 0.01 to 2.0 weight percent, based on the weight of the rosin.

At least one disproportionation catalyst may also be used in preparing the acid-modified rosin ester tackifiers of the present invention. Examples of disproportionation catalysts include supported or non-supported metals, such as palladium, nickel and platinum; iodine; iodides, such as iron iodide; sulfur dioxide; and sulfides, such as iron sulfide. Other suitable disproportionation catalysts include mono- and polysulfides of beta-naphthol and phenol sulfides, such as an amylphenol sulfide polymer.

In those embodiments utilizing esterification and/or disproportionation catalysts, the catalysts may be added directly to the molten rosin prior to the addition of any other esterification reaction components or they may be added after the polyhydric alcohol has been added to the molten rosin. They may be added together or separately, at different stages of the esterification reaction. When used, the esterification catalyst is preferably used in amounts between about 0.01 to 2 percent by weight, based on the weight of the rosin, while the disproportionation catalyst is used in amounts between about 0.05 to 1.0 weight percent, based on the weight of the rosin.

Applicant has surprisingly found that the addition of an aromatic dibasic acid in certain amounts and under certain conditions will increase the softening point of the acid-modified rosin ester, while at the same time retaining compatibility of the acid-modified rosin ester with polymers or copolymers used in hot melt adhesives. The aromatic dibasic acid is added in an amount effective to increase the softening point of the acid-modified rosin ester tackifier by at least about 2 percent when compared to a comparable unmodified polyhydric alcohol rosin ester. Preferably, the dibasic acid is added in amounts between about 1 to 8 percent, most preferably between about 2 to 6 percent by weight, based on the weight of the acid-modified rosin ester tackifier. The amount of acid added and the point in the esterification reaction at which the acid is added generally determine the tackifier properties of softening point, color and clarity.

The dibasic acid may be added to the esterification reaction with or without an equivalent percent excess of the polyhydric alcohol being present, based on the weight of the rosin. Preferably, the polyhydric alcohol will be present in the esterification reaction mixture in amounts up to 10 percent equivalent excess of the rosin.

The dibasic acid may be added directly to the molten rosin prior to the addition of the polyhydric alcohol. In this instance, it is preferred that the acid level be from about 1 to 4 percent by weight, based on the weight of the tackifier, and that the polyhydric alcohol be present in amounts up to 10 percent equivalent excess of the rosin. More preferably, the dibasic acid is added to the esterification reaction after the rosin and alcohol have reacted to the point that the acid number of the esterification reaction mixture has dropped to less than about 100. In most preferred embodiments, the aromatic dibasic acid is added to the esterification reaction after the acid number of the esterification reaction mixture has dropped to less than about 50. Acid number, as used herein, refers to the milligrams of potassium hydroxide required to neutralize one gram of rosin.

The rosin ester tackifier thus modified will exhibit a higher softening point when compared to a comparable unmodified rosin ester, without experiencing an expected corresponding large increase in the molecular weight of one of its fractions. Therefore, the rosin ester tackifier of the present invention will maintain compatibility with the polymers or copolymers as described herein, and in particular, with styrenebutadiene-styrene (SBS) and ethylene-vinyl acetate (EVA) copolymers used in hot melt adhesives.

Aromatic dibasic acids which may be used in the preparation of tackifiers of the present invention include ortho-phthalic acid, isophthalic acid, terephthalic acid and phthalic anhydride. Most preferred is isophthalic acid.

Other components may also be added to the esterification reaction depending upon the properties desired in the final hot melt adhesive composition. For example, other tackifiers, plasticizers, neutralizing agents, antioxidants, viscosity stabilizers and the like may be added.

The polymers or copolymers employed in the hot melt adhesive compositions of the present invention include ethylenic copolymers of ethylene and other various monomers such as vinyl acetate, methyl acrylate, ethyl acrylate and other acrylates. In addition, styrenic block copolymers (SBC), such as SBS, styreneisoprene-styrene (SIS) and styrene-ethylene-butylenestyrene (SEBS) are employed in the present invention. EVA and SBS based copolymers are particularly preferred in the hot melt adhesive compositions of the present invention.

Preferred examples of the wax employed in the ethylenic copolymer-based hot melt adhesive compositions of the present invention are mineral waxes such as paraffin wax and microcrystalline wax and synthetic waxes such as polyethylene wax and polypropylene wax. Other animal or vegetable waxes may also be used.

Preferred examples of the oil employed in the SBC-based hot melt compositions of the present invention are mineral oils of relatively high molecular weight and olefin oligomers. Other vegetable and/or animal oils may also be used. Oils which may be used include Kaydol TM White mineral oil, a liquid hydrocarbon refined from petroleum (Whitco Corp., New York, N.Y.) and Shellflex TM 371, a petroleum hydrocarbon which is a solvent-refined, hydro-treated, acid-treated, heavy naphthenic distillate (Shell Chemical, Houston, Tex.). The oils are given as examples and are not intended to limit the scope of the claims of the application.

In preferred embodiments of methods for the preparation of the acid-modified rosin ester tackifiers used in the hot melt adhesive compositions of the present invention, a tall oil rosin is melted in an inert atmosphere, such as nitrogen gas. The esterification reaction preferably is conducted in the presence of a nitrogen gas atmosphere provided by nitrogen purge of the reaction vessel prior to the addition of the reactants and a nitrogen sparge during the reaction. Since light color is one desirable property of the rosin ester, and the color is sensitive to oxygen exposure, oxygen exposure is preferably minimized.

The rosin will make up from about 78 to 92 percent by weight of the tackifier, more preferably from about 80 to 90 percent by weight of the tackifier. To the molten rosin are added pentaerythritol, isophthalic acid and catalytic amounts of esterification and disproportionation catalysts. The pentaerythritol is preferably present in amounts up to about 10 percent equivalent excess of the rosin, while the isophthalic acid is present in amounts between about 1 to 8 percent by weight of the tackifier. The esterification catalyst is present in amounts between about 0.01 to 2 percent, while the disproportionation catalyst is present in amounts between about 0.05 to 1 percent, all being weight percents based on the weight of the rosin.

The reaction mixture is maintained at a temperature between about 180° to 300° C. for a time effective to complete the esterification reaction, typically 8 to 15 hours. Progress of the esterification may be followed by conventional analysis of the reaction mixture to determine the acid number. Generally, the esterification may be terminated to any desired acid number. The esterification reaction is considered to be substantially complete when the acid number does not change appreciably with time. Preferably, the esterification reaction is terminated when the acid number of the esterification reaction mixture is less than about 20, more preferably less than about 15.

In most preferred methods for the preparation of the tackifiers of the present invention, catalytic amounts of esterification and disporportionation catalysts are added directly to the molten rosin. The pentaerythritol is then added to the reaction vessel and the temperature of the mixture is raised to about 270° C. The mixture is then allowed to react until the acid number of the mixture has dropped to less than about 50. The desired amount of the isophthalic acid, most preferably between about 2 to 6 weight percent of the tackifier, is added to the reaction mixture. The mixture is then allowed to react further until the acid number of the esterification reaction mixture is less than about 15. The reaction mixture is then cooled to approximately 200° C., at which point it is discharged from the reaction vessel.

The resulting acid-modified polyhydric alcohol rosin ester tackifiers have increased softening points when compared to comparable unmodified polyhydric rosin esters, while maintaining relatively low molecular weights ranging from about 1000-1800. The acid-modified rosin ester tackifiers typically have softening points at least about 2 percent higher than comparable unmodified rosin esters, and in some cases, as much as 20 percent higher than the unmodified rosin esters. The tackifiers are compatible with copolymers, particularly EVA copolymers and SBS block copolymers, which are used in hot melt adhesive formulations, which compatibility is evidenced by the clarity of the resulting hot melt adhesive compositions. The hot melts are also stable to changes in viscosity, in that the tackifiers may be used in the hot melt adhesive compositions of the present invention without problems associated with excessive increase in viscosity over time.

Generally, the ethylenic copolymer-based hot melt adhesive compositions of the present invention are prepared by combining, preferably in an inert atmosphere, the acid-modified rosin ester tackifier with the wax at a temperature effective to melt both the tackifier and the wax without degrading either. The tackifier is preferably added at from about 10 to 60 percent by weight, with the wax being added at from about 5 to 50 percent by weight. After the tackifier/wax mixture has been melted with agitation, from about 10-75 weight percent of the ethylenic copolymer is added slowly to the molten mixture. All weight percents are based on the total weight of the hot melt adhesive composition.

In preferred embodiments, about 50 weight percent of an isophthalic acid-modified rosin ester is combined with about 20 weight percent of a paraffin microcrystalline wax and the mixture is melted with agitation at a temperature of about 177° C. About 30 weight percent of an EVA copolymer is added slowly to the molten mixture over a period of from about ½ to about 1 hour. After the EVA copolymer is thoroughly incorporated into the molten mixture, thereby forming a homogenous mixture of the tackifier, wax and copolymer, the hot melt adhesive is discharged and cooled to room temperature.

The EVA-based hot melt adhesive compositions of the present invention comprise from about 10 to 75 weight percent of an EVA copolymer, from about 5 to 50 weight percent of a wax and from about 10 to 60 percent of an acid-modified rosin ester tackifier. More preferably, the hot melt adhesive comprises from about 10 to 40 weight percent of the EVA copolymer, from about 5 to 30 weight percent of the wax and from about 30 to 60 weight percent of the acid-modified rosin ester. The resultant adhesives may be used as hot melt carton and package sealing adhesives, sealants, bookbinding adhesives, and various assembly adhesives.

Generally, the SBC (e.g., SEBS, SIS and SBS) copolymer adhesives may be formulated using techniques known in the art. An exemplary procedure involves placing approximately half of the total tackifying resin concentration in a jacketed mixing kettle, preferably in a jacketed heavy duty mixer which is equipped with rotors and thereupon raising the temperature to a range of from about 230° to 350° F., the precise temperature utilized depending on the melting point of the particular tackifying resins. When the resin has melted, stirring is initiated and the block polymer are added together with any stabilizer or optional additives whose presence may be desired, the addition of the latter components being extended over a prolonged period in order to avoid the formation of lumps. Mixing and heating are continued until a smooth, homogeneous mass is obtained whereupon the remainder of the tackifying resin and the oil are thoroughly and uniformly admixed therewith. The resultant hot melt adhesives are generally produced with an oil in bulk form and packages in release coated tube or boxes.

The resultant adhesives may be used in the assembly or construction of various disposable applications including but not limited to, sanitary napkins, disposable diapers, hospital gowns, bed pads and the like. In particular, adhesives are useful for the assembly of disposable articles using multi-line construction techniques wherein at least one polyethylene or polypropylene substrate is bonded to at least one tissue, non-woven, polyethylene substrate. In addition, the adhesives are useful in the bonding of elastic to polyethylene, polypropylene or non-woven substrate so as, for example, to impart elongation resistant gathers thereto. The adhesive may also be utilized in less demanding disposable construction applications such as for end of perimeter sealing.

The SBC-based adhesive compositions of the present invention comprise from about 10 to 70 weight percent of the SBC, from about 10 to 40 weight percent oil and from about 20 to 70 percent of an acid-modified rosin ester tackifier. More preferably, the hot melt adhesive comprises from about 20 to 40 weight percent of the SBC, from about 5 to 25 weight percent oil and from 30-60 weight percent of the acid-modified rosin ester.

The following Examples describe the manner and the process of making and using the invention and set forth the best mode of carrying out the invention but are not to be considered as limiting the invention.

EXAMPLES

Example 1

To a suitable reaction vessel equipped with a stirrer and a thermometer were added 2000 grams of a tall oil rosin having an acid number of 178 and a ring and ball softening point of 82. The rosin was heated in a nitrogen atmosphere to about 170° C. to melt the rosin. To the molten rosin were added 10.6 grams of Vultac TM −2 (Pennwalt Corp., Philadelphia, Pa.), 2.3 grams of phosphorous acid, and 246 grams of penta-erythritol. The mixture was heated to approximately 270° C., and the mixture was allowed to react until the acid number of the reaction mixture decreased to about 30. Vacuum and a steam sparge were applied to the reaction vessel, and the mixture was allowed to react until the acid number of the reaction mixture was about 9. The vacuum and steam sparge were then removed from the reaction vessel, and the vessel was cooled to approximately 220° C. at which point 8.3 grams of a stabilizing package containing an antioxidant and a viscosity stabilizer were added to the reaction mixture. The rosin ester was further cooled to about 170° C., was discharged from the vessel and allowed to cool to room temperature. The resulting unmodified rosin ester was analyzed for acid number, ring and ball softening point, and color, as described herein below. Results are found in Table 1.

An EVA-based hot melt adhesive composition was prepared utilizing the unmodified rosin ester tackifier, by combining about 50 weight percent of the rosin ester with about 20 weight percent of a paraffin microcrystalline wax (Be Squared TM 185 Amber; Petrolite Corporation, St. Louis, Mo.) and melting the rosin ester/wax mixture with agitation at about 177° C. To the molten mixture was added about 30 weight percent of an ethylene-vinyl acetate copolymer (Elvax TM 250; E. I. DuPont co., Wilmington, Del.). The EVA copolymer was added slowly over a period of about ½ hour. After a homogeneous mixture of the rosin ester, wax and EVA copolymer was formed, appropriate aliquots of the hot melt were drawn to be tested for Clarity, color and viscosity stability according to methods described herein below. Results of those tests are found in Table 2.

Example 2

To an appropriate reaction vessel as described in Example 1 were added 2000 grams of a tall oil rosin having an acid number of 178 and a ring and ball softening point of 82. The rosin was heated to about 180° C. with agitation to melt the rosin. To the molten rosin were added 10.6 grams of Vultac-2, 2.3 grams of phosphorous acid and 246 grams of pentaerythritol. The temperature of the mixture was raised to about 270° C. and allowed to react until the acid number of the reaction mixture was about 50. To the reaction mixture was added 46.9 grams of isophthalic acid. The mixture was allowed to react until the acid number reached about 30, at which point vacuum and a steam sparge were applied to the reaction vessel. The mixture was further allowed to react until the acid number of the reaction mixture was about 8, at which time the vacuum and steam sparge were removed from the vessel. The temperature of the reaction mixture was reduced to about 220° C., at which point about 8.3 grams of a stabilizing package containing an antioxidant and a viscosity stabilizer were added to the reaction mixture. The acid-modified rosin ester was further cooled to about 170° C., was discharged from the vessel and allowed to cool to room temperature. The resulting acid-modified rosin ester was then analyzed for acid number, ring and ball softening point and color, as described herein below. Results are found in Table 1.

A hot melt adhesive composition utilizing the acid-modified rosin ester tackifier was prepared according to methods described in Example 1. The hot melt adhesive was then tested for color, clarity and viscosity stability as described herein below. Results are found in Table 2.

Example 3

An acid-modified rosin ester was prepared according to the procedure of Example 2, with the exception that 272.2 grams of pentaerythritol and 140.7 grams of isophthalic acid were used in Example 3. The resulting acid-modified rosin ester was analyzed for acid number, ring and ball softening point and color, as described herein below. Results are found in Table 1.

A hot melt adhesive composition was prepared utilizing the acid-modified rosin ester tackifier according to methods described in Example 1. The resulting hot melt adhesive composition was tested for color, clarity and viscosity stability, as described herein below. Results are found in Table 2.

Test Procedures

The softening points of the rosin ester tackifiers were determined by ring and ball softening point methods which are well-known to those skilled in the art. Acid number, as used herein, refers to the number of milligrams of potassium hydroxide required to neutralize one gram of rosin ester.

The color values for both the rosin ester tackifiers and the hot melt adhesive compositions were determined by placing an appropriate amount of neat, molten material in a Gardner color tube and then comparing the color of the molten material to a Gardner scale. Methods for determining color by the Gardner scale are also well-known to those skilled in the art.

For the determination of viscosity stability, and clarity of the hot melt adhesive compositions, the resulting molten hot melt adhesives prepared according to the methods described above were initially tested for viscosity at 177° C. using a Brookfield LVT Viscometer. The molten hot melt was placed into a receptacle and initial visual observations were made of the bottom of the receptacle as seen through the depth of the hot melt adhesive to determine clarity. The receptacle containing the hot melt adhesive was then placed in a forced air oven at 177° C. for 96 hours. The receptacle was then removed from the oven and final viscosity measurements and visual observations were made, again viewing the bottom of the receptacle through the depth of the hot melt adhesive. For the purposes of this application, the clarity values attached to the resulting hot melt adhesives are as follows:

0 = Clear
1 = Very Slightly Hazy
2 = Slightly Hazy
3 = Hazy

TABLE 1
ACID-MODIFIED ROSIN ESTER

| Example | Isophthalic Acid Added, Weight. % | Acid No. | Softening Point °C. | Color G |
|---|---|---|---|---|
| 1 | 0 | 9 | 101.5 | 4− |
| 2 | 2 | 7.8 | 108.7 | 4− |
| 3 | 6 | 8.6 | 122.0 | 3+ |

TABLE 2
HOT MELT ADHESIVE

| | Clarity | | Color (G) | | % Viscosity |
|---|---|---|---|---|---|
| Example | Initial | Final | Initial | Final | Increase |
| 1 | 1 | 1 | 4+ | 12− | 19 |
| 2 | 0 | 2 | 4 | 11+ | 12 |
| 3 | 1 | 3 | 4− | 11+ | 25 |

I claim:
1. A hot melt adhesive composition, comprising:
   (a) at least one of an ethylenic copolymer and a styrenic block copolymer; and
   (b) an acid-modified rosin ester tackifier, said rosin ester tackifier comprising:
      from about 78–92 percent by weight of a rosin;
      up to about 10 percent equivalent excess of a polyhydric alcohol, based on the weight of the rosin; and
      from about 1–8 percent by weight of an aromatic dibasic acid.

2. The composition of claim 1 wherein the rosin is selected from the group consisting of gum rosin, wood rosin and tall oil rosin.

3. The composition of claim 2 wherein the rosin is tall oil rosin.

4. The composition of claim 1 wherein the polyhydric alcohol is selected from the group consisting of pentaerythritol, glycerol, ethylene glycol, propylene glycol, diethylene glycol, triethylene glycol, tetraethylene glycol, trimethylene glycol, mannitol, sorbitol and mixtures thereof.

5. The composition of claim 4 wherein the polyhydric alcohol is pentaerythritol.

6. The composition of claim 1 wherein the aromatic dibasic acid is selected from the group consisting of ortho-phthalic acid, isophthalic acid, terephthalic acid and phthalic anhydride.

7. The composition of claim 6 wherein the aromatic dibasic acid is isophthalic acid.

8. The composition of claim 1 comprising from about 10 to 75 weight percent of at least one of the ethylenic copolymer and the styrenic block copolymer.

9. The composition of claim 8 wherein the ethylenic copolymer is an ethylene-vinyl acetate copolymer.

10. The composition of claim 8 wherein the styrenic block copolymer is selected from the group consisting of styrene-butadiene-styrene, styreneisoprene-styrene and styrene-ethylene-butylene-styrene.

11. The composition of claim 1 further comprising at least one of an oil and a wax.

12. The composition of claim 11 comprising from about 0–40 weight percent of the oil selected from the group consisting of mineral oil, vegetable oil, animal oil and olefin oligomers.

13. The composition of claim 11 comprising from about 5–50 weight percent of the wax selected from the group consisting of mineral, animal and vegetable wax.

14. The composition of claim 1 comprising from about 10 to 60 weight percent of the acid-modified rosin ester tackifier.

15. A hot melt adhesive composition, comprising:
   (a) from about 10 to 75 weight percent of at least one of an ethylenic copolymer and styrenic block copolymer selected from the group consisting of ethylene-vinyl acetate, styrene-butadiene-styrene, styreneisoprene-styrene, and styrene-ethylenebutylene-styrene;
   (b) from about 0 to 50 weight percent of at least one of an oil selected from the group consisting of mineral oil, vegetable oil, animal oil and olefin oligomers, and a wax selected from the group consisting of mineral, animal and vegetable wax; and
   (c) from about 10 to 60 weight percent of an acid-modified rosin ester tackifier, said tackifier comprising:
      from about 78 to 92 weight percent of a tall oil rosin,
      up to about 10 percent equivalent excess of pentaerythritol based on the weight of the rosin; and
      from about 1 to 8 weight percent of isophthalic acid.

16. An acid-modified rosin ester tackifier for use in hot melt adhesive compositions, comprising:

(a) a rosin, (b) a polyhydric alcohol; and (c) an aromatic dibasic acid.

17. The tackifier of claim 16 comprising from about 78 to 92 weight percent of the rosin, up to about 10 percent equivalent excess of the polyhydric alcohol, based on the weight of the rosin, and from about 1 to 8 weight percent of the aromatic dibasic acid.

18. The method of claim 17 wherein the rosin is selected from the group consisting of tall oil rosin, gum rosin and wood rosin.

19. The method of claim 18 wherein the rosin is tall oil rosin.

20. The method of claim 17 wherein the polyhydric alcohol is selected from the group consisting of pentaerythritol, glycerol, ethylene glycol, propylene glycol, diethylene glycol, triethylene glycol, tetraethylene glycol, trimethylene glycol, mannitol, sorbitol and mixtures thereof.

21. The method of claim 20 wherein the polyhydric alcohol is pentaerythritol.

22. The method of claim 17 wherein the aromatic dibasic acid is selected from the group consisting of ortho-phthalic acid, isophthalic acid, terephthalic acid and phthalic anhydride.

23. The method of claim 22 wherein the aromatic dibasic acid is isophthalic acid.

24. The tackifier of claim 16 further comprising catalytic amounts of at least one esterification catalyst, based on the weight of the rosin.

25. The tackifier of claim 16 further comprising catalytic amounts of at least one disproportionation catalyst, based on the weight of the rosin.

26. An acid modified rosin ester tackifier for use in hot melt adhesive compositions, comprising:

(a) from about 78 to 92 weight percent of a tall oil rosin (b) up to about 10 percent equivalent excess of pentaerythritol, based on the weight of the tall oil rosin; and (c) from about 2 to 6 weight percent of isophthalic acid.

27. The tackifier of claim 26 further comprising from about 0.01 to 2 weight percent of at least one esterification catalyst, based on the weight of the rosin.

28. The tackifier of claim 26 further comprising from about 0.05 to 1 weight percent of at least one disproportionation catalyst, based on the weight of the rosin.

* * * * *